United States Patent
Sia, Jr. et al.

(10) Patent No.: US 9,789,752 B1
(45) Date of Patent: Oct. 17, 2017

(54) WINDOW SHADE HOOK ASSEMBLY, AND METHODS OF USE AND MANUFACTURE THEREOF

(71) Applicant: Honda Motor Co., Ltd., Tokyo (JP)

(72) Inventors: Generoso Tan Sia, Jr., Plain City, OH (US); Jason R. Dilley, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/096,130

(22) Filed: Apr. 11, 2016

(51) Int. Cl.
  *B60J 3/02* (2006.01)
  *B60J 1/20* (2006.01)
(52) U.S. Cl.
  CPC ........... *B60J 1/2047* (2013.01); *B60J 1/2086* (2013.01)
(58) Field of Classification Search
  CPC .......................... B60J 1/2047; B60J 1/2086
  USPC ...... 296/97.9, 143, 138; 160/370.21–370.23, 160/903, DIG. 2, DIG. 3, 290, 1
  See application file for complete search history.

(56) References Cited

U.S. PATENT DOCUMENTS

| | | | | |
|---|---|---|---|---|
| 5,560,575 A | * | 10/1996 | Krysiak | F16B 19/1081 248/222.12 |
| 6,179,366 B1 | | 1/2001 | Hansz | |
| 6,324,732 B1 | | 12/2001 | Arisaka et al. | |
| 6,368,009 B1 | | 4/2002 | Noda | |
| 6,491,333 B2 | | 12/2002 | Ichikawa et al. | |
| 7,189,112 B2 | * | 3/2007 | Hamaguchi | F16B 5/0642 24/581.1 |
| 7,401,840 B2 | | 7/2008 | Schnoblen et al. | |
| 7,438,341 B1 | | 10/2008 | Olson | |
| 7,798,552 B2 | | 9/2010 | Takai | |
| 8,141,832 B2 | | 3/2012 | Chak | |
| 8,579,010 B2 | | 11/2013 | Medlar et al. | |
| 8,678,468 B2 | | 3/2014 | Huelke et al. | |
| 8,851,150 B2 | | 10/2014 | Yamase et al. | |
| 8,875,775 B2 | | 11/2014 | Ross et al. | |

(Continued)

FOREIGN PATENT DOCUMENTS

DE 102004050057 * 1/2006
EP 1798082 A2 6/2007

OTHER PUBLICATIONS 2005-2010 Honda Odyssey Sliding Door Sunshade Clip Hook Kit Genuine OEM: http://www.autopartscheaper.com/2005-2010-Honda-Odyssey-Sliding-Door-Sunshade-Clip-p/4-83715-shj-a21za-f12.htm.

(Continued)

*Primary Examiner* — Dennis H Pedder
(74) *Attorney, Agent, or Firm* — Kenealy Vaidya LLP (57) ABSTRACT

Some embodiments are directed to a hook assembly for use with a vehicle having a vehicle interior, a vehicle door having a window bordered by a lining, and a sunshade assembly configured to cover the window, the sunshade assembly having a support member by which the sunshade assembly can be secured to the lining to cover the window. The hook assembly can include a grommet configured to be connected to the lining. The hook assembly can also include a hook member configured to be disposed adjacent and attached to the grommet such that the grommet is disposed between the hook member and the lining, the hook member including a hook extending therefrom, the hook being configured to engage the support member to secure the sunshade assembly to the lining to cover the window.

16 Claims, 8 Drawing Sheets

(56) References Cited

U.S. PATENT DOCUMENTS

| | | | |
|---|---|---|---|
| 8,919,856 B2* | 12/2014 | Sia, Jr. | .................. B60J 1/2047 296/152 |
| 8,960,762 B2 | 2/2015 | Huelke et al. | |
| 2008/0141501 A1 | 6/2008 | Kuroda | |
| 2012/0298316 A1 | 11/2012 | Hirano | |

OTHER PUBLICATIONS

ITW Delfast—Product Range: http://www.itwdelfast.in/index-4_html.html.

* cited by examiner

WINDOW SHADE HOOK ASSEMBLY, AND METHODS OF USE AND MANUFACTURE THEREOF

BACKGROUND

The disclosed subject matter relates to a window shade hook assembly, and methods of use and manufacture thereof. More particularly, the disclosed subject matter relates to methods and apparatus that enhance window shade securement.

Many types of vehicles include windows, which allow vehicle occupants to see outside of the vehicle. However, light from various light sources (including sunlight) tends to enter into vehicle interiors via the vehicle windows. This light can cause irritation or harm to vehicle occupants, as well as damage in the form of wear to vehicle components. This detrimental light can be influenced by a variety of factors, including implementation of shades or screens configured to cover windows through which the light enters the vehicle interior. Additionally, vehicle occupants may desire privacy within the vehicle interior not afforded by windows.

SUMMARY

However, various vehicular design factors may make it challenging to sufficiently cover windows with shades or screens to impede entry of detrimental light or provide privacy. For example, structural considerations for shades or screens may make it beneficial to provide spring-biased assemblies that can expand from and contract into vehicle panels to facilitate efficient packaging. These spring-biased assemblies can be unwound and drawn across the window by a support member attached to the screen. These support members and attached screens may be spring-biased when covering the window such that the assemblies are urging the screens to wind back into the vehicle panel and expose the window. As a result, the vehicle interior, as well as occupants located therein, can be subject to irritation and harm or damage from light entering the vehicle interior through the windows.

It may therefore be beneficial to provide a window shade hook assembly, and methods of use and manufacture thereof, that address at least one of the above and/or other challenges of related art vehicles. In particular, it may be beneficial to enhance window shade securement, such as by enhancing assembly time for installation and servicing of a hook assembly to which the window shade may be secured to cover the window. For example, the hook assembly can have multiple components to facilitate efficient installation and servicing should deformation or breakage of part of the hook assembly occur. Thus, deformed or broken components of the hook assembly must be configured to be replaceable.

In some of these and/or other embodiments, the window shade hook assembly can be configured to include a grommet for mounting a hook member to the door lining around the window. In some of these and/or other embodiments, the grommet and the hook member can have interlocking surfaces configured to engage each other upon proper orientation thereof, thereby ensuring correct assembly and/or servicing of the hook assembly. In some of these and/or other embodiments, the grommet can be shaped so as to be complementary to a shape of an opening in the lining into which the grommet is pressed to connect the hook assembly to the lining. In some of these and/or other embodiments, the hook member can be covered by a cap to conceal a fastener inserted through both the hook member and the grommet to secure the hook assembly to the lining.

Some embodiments are therefore directed to a hook assembly for use with a vehicle having a vehicle interior, a vehicle door having a window bordered on at least a side by a lining disposed within the vehicle interior, and a sunshade assembly configured to extend over at least part of the window so as to at least partially cover the window, the sunshade assembly having a support member by which the sunshade assembly can be secured to the lining to extend over and cover at least part of the window. The hook assembly can include a grommet configured to be connected to the lining. The hook assembly can also include a hook member configured to be disposed adjacent and attached to the grommet such that the grommet is disposed between the hook member and the lining, the hook member including a hook extending therefrom, the hook being configured to engage the support member to secure the sunshade assembly to the lining to extend over and cover at least part of the window.

Some other embodiments are directed to a vehicle door assembly for use with a vehicle having a vehicle interior. The vehicle door assembly can include a vehicle door; a window disposed within the vehicle door; a lining disposed within the vehicle interior and bordering at least a side of the window; a sunshade assembly configured to extend over at least part of the window so as to at least partially cover the window, the sunshade assembly having a support member by which the sunshade assembly can be secured to the lining to extend over and cover at least part of the window; and a hook assembly. The hook assembly can include a grommet configured to be connected to the lining. The hook assembly can also include a hook member configured to be disposed adjacent and attached to the grommet such that the grommet is disposed between the hook member and the lining, the hook member including a hook extending therefrom, the hook being configured to engage the support member to secure the sunshade assembly to the lining to extend over and cover at least part of the window.

Still other embodiments are directed to a method of installing a hook assembly in a vehicle having a vehicle interior, a vehicle door having a window bordered on at least a side by a lining disposed within the vehicle interior, and a sunshade assembly configured to extend over at least part of the window so as to at least partially cover the window, the sunshade assembly having a support member by which the sunshade assembly can be secured to the lining to extend over and cover at least part of the window. The method can include: connecting a grommet to the lining; and connecting a hook member to the grommet such that the grommet is disposed between the hook member and the lining, the hook member including a hook extending therefrom, the hook being configured to engage the support member to secure the sunshade assembly to the lining to extend over and cover at least part of the window.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
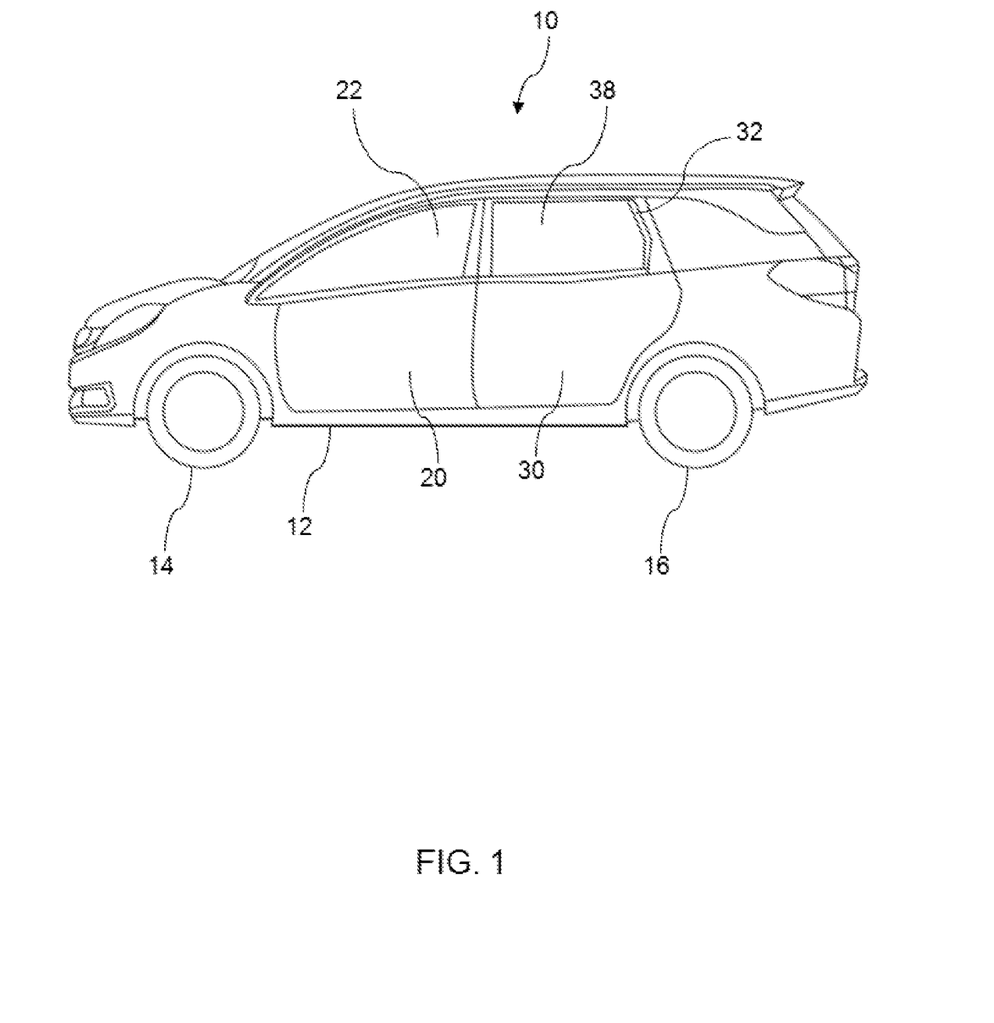
FIG. 1 is a side view of an exemplary vehicle including rear doors in accordance with the disclosed subject matter.

FIG. 1 is a side view of an exemplary vehicle 10 including a rear door 30 having an exemplary hook assembly 40 in accordance with the disclosed subject matter. The vehicle 10 shown in FIG. 1 is primarily for use on paved roadways, and can be referred to as a passenger vehicle. Specifically, the vehicle 10 shown in FIG. 1 is a minivan. The vehicle 10 may also be for use on unpaved roadways consisting of gravel, dirt, sand, etc.

However, the disclosed hook assembly 40 of the rear door 30 can be used with any vehicle that is configured for travel along any one or combination of improved, unimproved, and unmarked roadways and paths consisting of gravel, dirt, sand, etc. For example, embodiments are intended to include or otherwise cover any type of automobile, including passenger car, minivan, truck, etc. In fact, embodiments are intended to include or otherwise cover configurations of the hook assembly 40 for use on other door assemblies and in any other type of vehicle, such as an aircraft, boat, ship, train, spacecraft, etc. Some other embodiments can be used in non-vehicular applications, such as for any other situation where covering a window with a sunshade may be desirable.

The vehicle 10 can include a body 12, a pair of front wheels 14 (the right-side front wheel is obstructed from view), a pair of rear wheels 16 (the right-side rear wheel is obstructed from view), a pair of front door assemblies 24 (the right-side front door assembly is obstructed from view), a pair of rear door assemblies 26 (the right-side rear door assembly is obstructed from view), a frame assembly, and a powertrain. The frame assembly and the powertrain are omitted from FIG. 1 for simplicity and clarity of the drawings.

II. Hook Assembly

Figure 2:
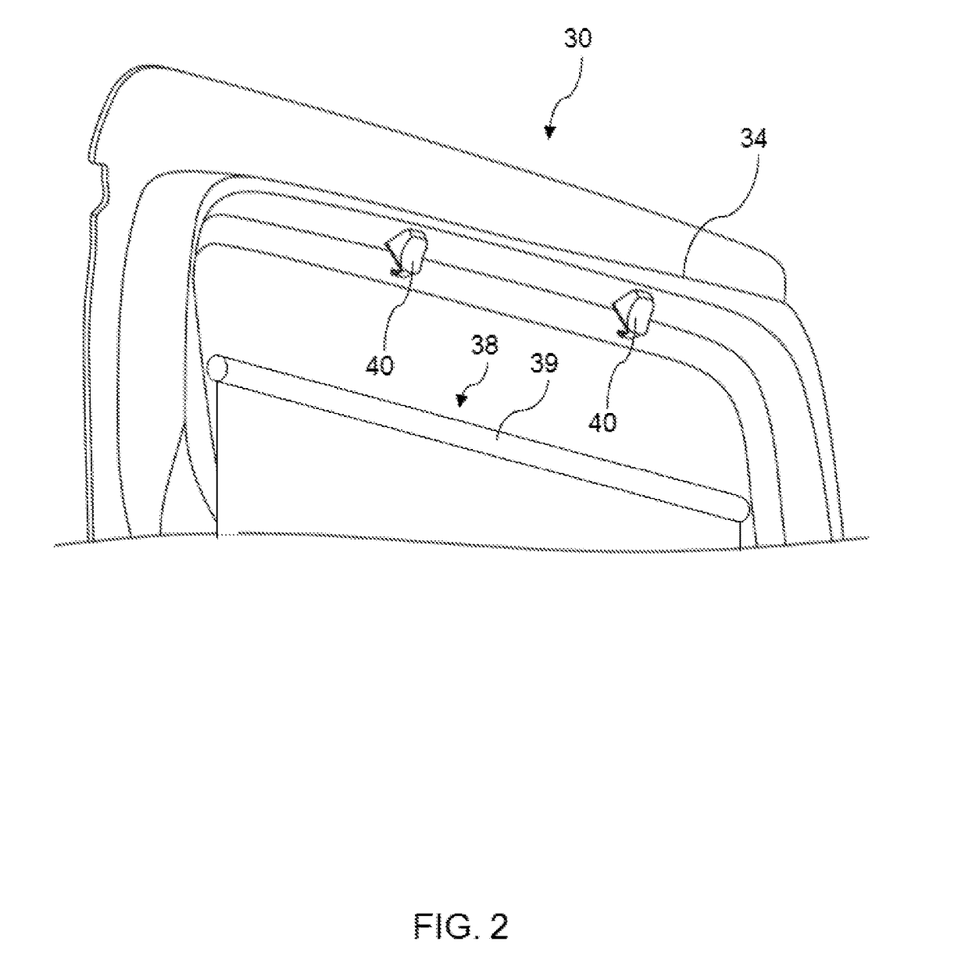
FIG. 2 is a partial perspective view of the rear door having hook assemblies.

FIG. 2 is a partial perspective view of the rear door 30 having hook assemblies 40. An interior side of the rear door 30 shown in FIG. 2 has a rear door lining 34 extending around a perimeter thereof, the hook assemblies 40 being connected to the rear door lining 34. Particularly, the hook assemblies 40 are configured to connect to an upper side of the rear door lining 34 such that the hook assemblies 40 extend downward from the upper side.

As will be described below, the hook assemblies 40 are configured for engagement with a support member (for example support member 39), such as a rod, of an exemplary sunshade assembly (for example, sunshade assembly 38) installed within the rear door 30. The sunshade assembly can be anchored at a portion of the rear door lining 34 extending along a lower edge of the rear window 32 at a beltline of the vehicle 10. The sunshade assembly can be configured to have a screen that unrolls upward from the rear door lining 34 to cover the rear window 32, the support member being attached to an upper edge of the screen and engaging the hook assemblies 40 to secure the screen in place covering the rear window 32. Specifically, the screen can be spring-biased such that a certain pulling force may be necessary to pull the screen upward to cover the rear window 32. A pull tab may be formed on the screen proximate the support member to facilitate pulling the screen over the rear window 32.

Various configurations of the sunshade assembly may be included in the rear door 30, such as those having screens extending from top, bottom, and side edges of the rear window 32. The hook assemblies 40 can therefore be configured to connect to any portion of the rear door lining 34 proximate the rear window 32 such that the hook assemblies 40 are disposed opposite the portion at which the sunshade assembly is anchored. The hook assemblies 40 can furthermore be configured to engage any type of support member attached to the screen and configured to secure the screen across the rear window 32. The support member may thus be configured as a rod, bar, clip(s), hook(s), etc. As will be described below, the hook assemblies 40 can therefore be configured to be complementary to the support member to promote engagement therebetween for securing the screen of the sunshade assembly over the rear window 32.

The rear door 30 of the present embodiment can have a pair of the hook assemblies 40 connected to each of the rear doors 30. However, any number of the hook assemblies 40 may be connected to the rear door linings 34 of the rear doors 30, such as one, two, three, four, etc. Furthermore, the hook assemblies 40 may be connected to any doors of the vehicle besides the rear doors 30 including the front doors 20, or a hatch assembly or a tailgate assembly. Additionally, the hook assemblies 40 can be connected to a window lining in the absence of a door. For instance, in some passenger vehicles such as a minivan, a third row of seating may be provided. Although additional doors specifically for the third row of seating may not be included in the vehicle 10, it may be desirable to have windows proximate the third row of seating in either side of the body 12. These third row windows may be configured with the hook assemblies 40 despite the windows being configured independent of corresponding doors.

Figure 3:
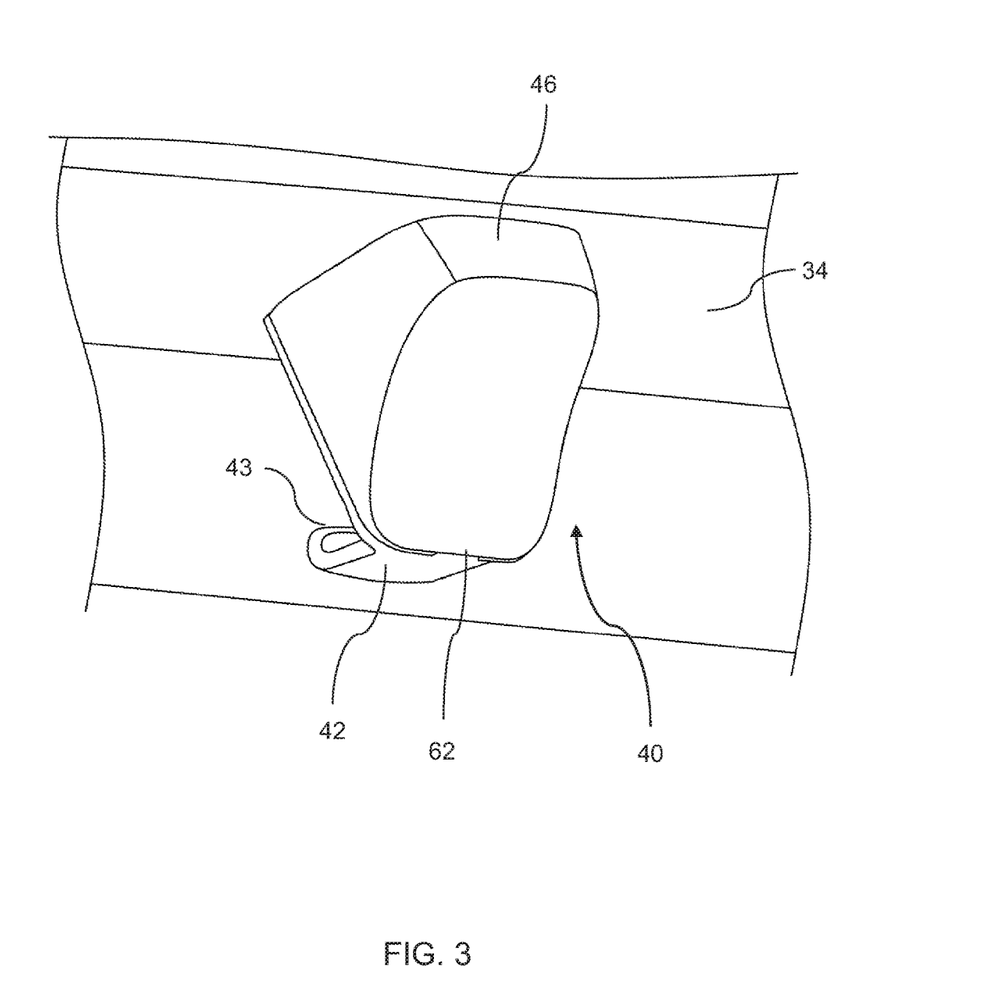
FIG. 3 is a perspective view of the hook assembly of FIG. 2.

FIG. 3 is a perspective view of the hook assembly 40 of FIG. 2. The hook assembly 40 shown in FIG. 3 can include a bracket 42 attached to the rear door lining 34, the bracket 42 being at least partially covered by a cap 46. The bracket 42 can include an outboard facing hook 43 configured for engagement with the support member of the sunshade assembly, as described above. The hook 43 can define an upward facing valley into which the support member can be placed to hold the screen across the rear window 32. The cap 46 may be configured to be snapped onto the bracket 42 to cover an inboard facing portion of the bracket 42. In the present embodiment, the cap 46 may have a contoured surface configured to be pressed upon for installing the cap 46 onto the bracket 42. A certain pressure may be required to snap the cap 46 onto the bracket 42. Alternatively, the cap 46 can be installed onto the bracket 42 by a variety of attachment methods other than snapping including clipping or sliding. The cap 46 may also include a cap notch 62 disposed along a lower edge adjacent the bracket 42, the cap notch 62 configured for engagement with a tool such as a screwdriver. The cap notch 62 can be engaged by the tool to dislodge the cap 46 from the bracket 42 and thereby access portions of the bracket 42 covered by the cap 46.

Figure 4:
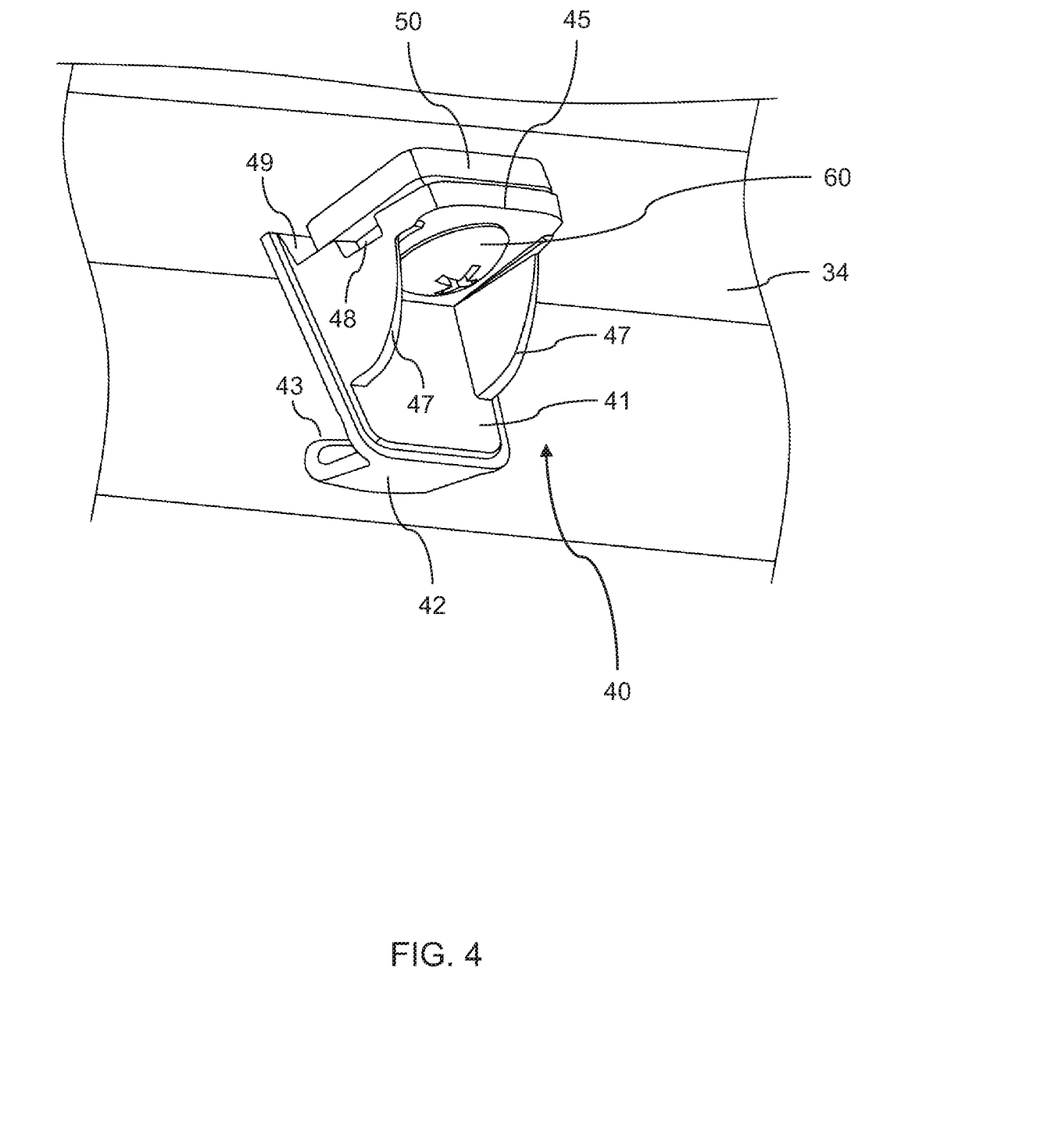
FIG. 4 is a perspective view of the hook assembly of FIG. 3 with a cap removed.

FIG. 4 is a perspective view of the hook assembly 40 of FIG. 3 with the cap 46 removed. The hook assembly 40 shown in FIG. 4 has a fastener 60 inserted therethrough to secure the hook assembly 40 to the rear door lining 34. Particularly, the fastener 60 can be a screw inserted through an aperture in a base 45 of the bracket 42. The rear door lining 34 can also have a corresponding aperture aligned with the aperture in the base 45 of the bracket 42 such that the fastener 60 may be inserted through both of the apertures to facilitate attachment. The fastener 60 can alternatively be configured as a push pin, nail, or any other appropriate fastener for attaching the hook assembly 40.

The bracket 42 of the hook assembly 40 can include the base 45 connected to a raised part 41, the raised part 41 extending downward from the base 45 towards the sunshade assembly. While the base 45 can extend along the rear door lining 34, the raised part 41 can extend approximately perpendicular from the base 45. The hook 43 may therein extend from the raised part 41 and face an exterior of the vehicle 10, i.e., outboard. The raised part 41 can be connected with the base 45 by a pair of buttresses 47 spanning corresponding and opposing sides thereof. The base 45 can additionally be spaced from a surface of the rear door lining 34 to which the hook assembly 40 may be attached by a stepped part 49. The stepped part 49 may correspond to a height of a grommet 50 that can be placed between the base 45 and the rear door lining 34 as an attachment mechanism. The stepped part 49 can thus extend from the rear door lining 34 the prescribed height of the grommet 50. The bracket 42 can also have one of a pair of notches 48 in each of opposing sides of the base 45 adjacent the respective buttresses 47. The notches 48 can be slots configured for engagement by protrusions on an inner surface of the cap 46 such that the protrusions can be snapped into the aligned notches 48 to secure the cap 46 over the bracket 42.

As described in more detail below, the grommet 50 can be configured as an elastic member shaped similarly to the base 45 of the bracket 42 so as to have approximately aligned perimeters when disposed adjacent each other.

Figure 5:
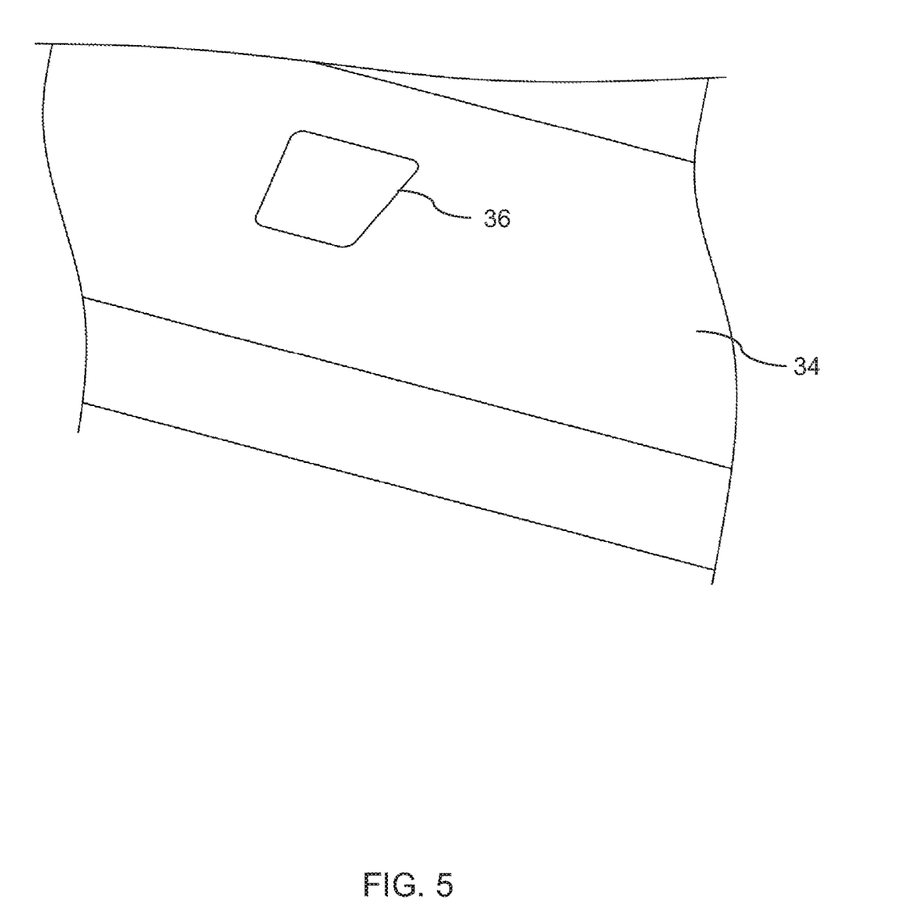
FIG. 5 is a perspective view of an exemplary aperture in the rear door in accordance with the disclosed subject matter.

FIG. 5 is a perspective view of an exemplary trapezoidal opening 36 in the rear door 30 in accordance with the disclosed subject matter. As shown in FIG. 5, the trapezoidal opening 36 in the rear door lining 34 is configured to be complementary to a trapezoidal shape of the grommet 50 that may be inserted therein. The opening 36 can extend into the rear door lining 34 at least a depth corresponding to a height of the grommet 50 configured to be inserted therein, as shown in more detail in FIG. 8 and described below.

Figure 6:
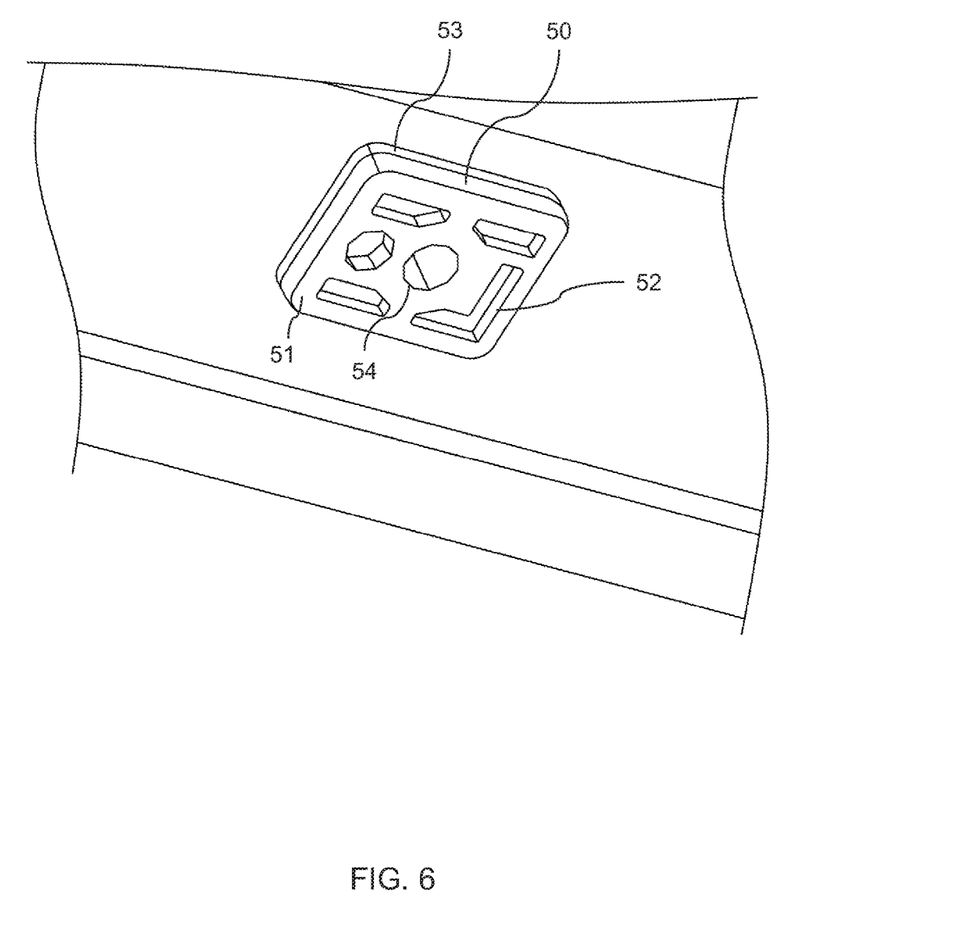
FIG. 6 is a perspective view of an exemplary foam seal and an exemplary grommet of the hook assembly in accordance with the disclosed subject matter.

FIG. 6 is a perspective view of an exemplary seal 58 and the exemplary grommet 50 of the hook assembly 40 in accordance with the disclosed subject matter. The grommet 50 shown in FIG. 6 can be inserted through a seal 58 and into the opening 36 in the rear door lining 34.

In some embodiments, the seal 58 can be disposed between the grommet 50 and the rear door lining 34 as a buffer. The seal 58 can be shaped similarly to the grommet 50 and may be elastic or malleable to facilitate tight securement of the hook assembly 40 to the rear door lining 34. The seal 58 can also have an opening therein through which the fastener 60 may be inserted to attach the hook assembly 40 to the rear door lining 34.

The grommet 50 can be configured with an outer face 51 facing the interior of the vehicle 10. The outer face 51 can be covered by the bracket 42 for installation and attachment of the bracket 42 to the rear door lining 34. Therefore, the outer face 51 may be configured to abut a complementary surface of the base 45 of the bracket 42 when the bracket 42 is placed against the grommet 50 for installation to the rear door lining 34. The outer face 51 may thus have a recessed portion such as a fitment recess 52 disposed thereon, the recess 52 configured so as to be complementary in shape to a protruding portion such as a fitment protrusion 56 on the base 45 of the bracket 42. Particularly, the fitment protrusion 56 and the recess 52 may both be L-shaped such that engagement between them may only occur when the bracket 42 and the grommet 50 are correctly oriented with each other. Since the L-shaped fitment protrusion 56 on the base 45 may only be inserted into the L-shaped recess 52 of the grommet 50 when both are aligned, the recess and protrusion 52,56 serve to prevent misaligned and improper fitment. In orientations wherein the recess and protrusion 52,56 are not aligned and therefore not engaged, a height of the fitment protrusion 56 can prevent the base 45 from resting relatively flush against the outer face 51 of the grommet 50. Installation of the hook assembly 40 onto the rear door 30 may therefore be impeded until the base 45 of the bracket 42 fits flush against the grommet 50, ensuring proper attachment of the hook assembly 40.

The recess and protrusion 52,56 may alternatively be otherwise shaped such that the recess and protrusion 52,56 are configured to engage each other to ensure proper orientation of the bracket 42 onto the grommet 50. For instance, the recess and protrusion 52,56 may be linear and arranged on corresponding sides of the outer face 51 and the base 45. There may also be a plurality of recesses and corresponding protrusions.

As described above, the grommet 50 can have a grommet aperture 54 disposed therein, the grommet aperture 54 configured for receiving the fastener 60 inserted through the bracket 42. The grommet aperture 54 may be a threaded opening into which the fastener 60 may be screwed to thereby secure the bracket 42 to the grommet 50. As will be described below, the grommet 50 can further have locking legs 55 configured to be pressed outward by insertion of the fastener 60 into the grommet aperture 54, the locking legs 55 expanding within an interior of the rear door lining 34 to secure the grommet 50, and thereby the bracket 42, against the rear door lining 34.

Figure 7:
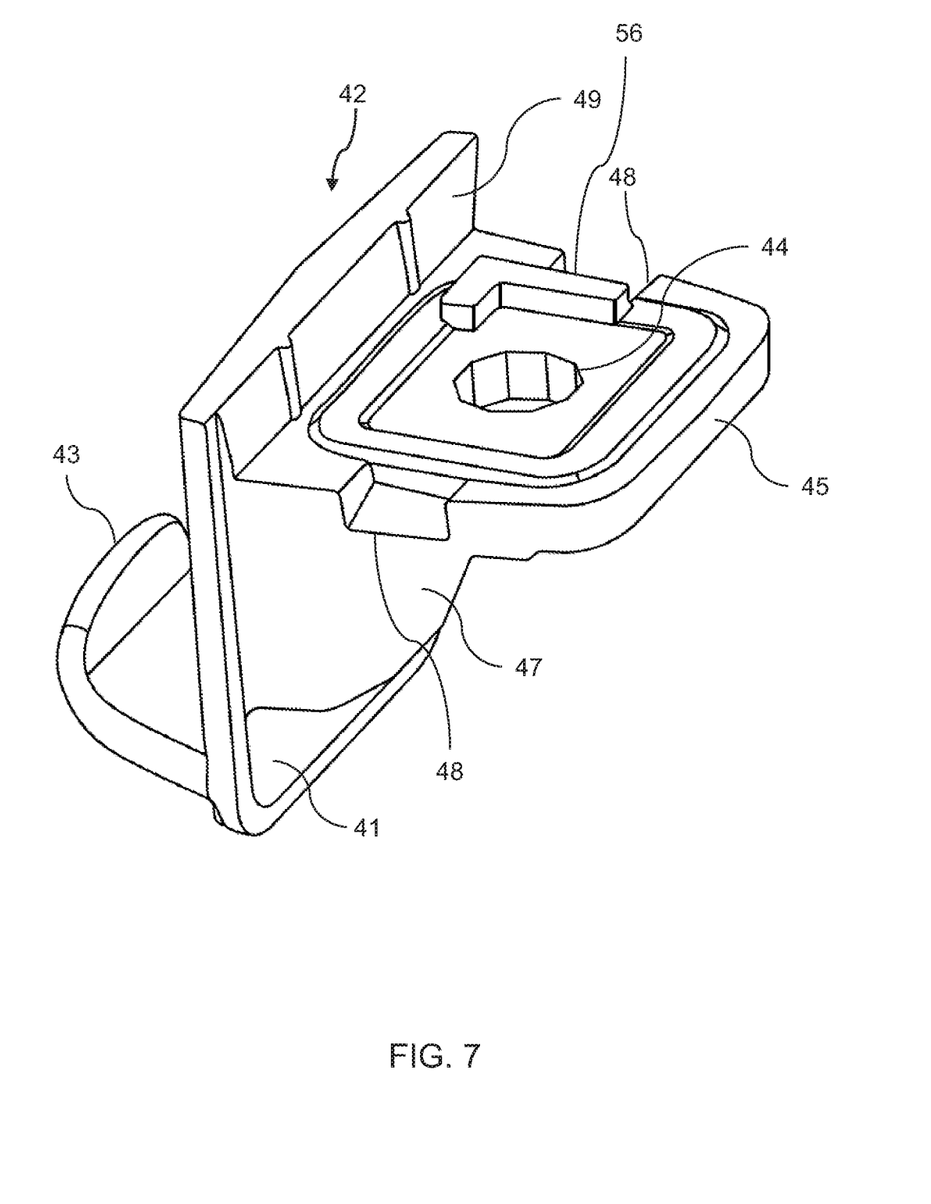
FIG. 7 is a perspective view of an exemplary hook bracket of the hook assembly in accordance with the disclosed subject matter.

FIG. 7 is a perspective view of the exemplary bracket 42 of the hook assembly 40 in accordance with the disclosed subject matter. As described above and shown in FIG. 7, the base 45 of the bracket 42 has an abutting face 64 on which the fitment protrusion 56 can be formed. The fitment protrusion 56 can be L-shaped and complementary to the recess 52 so as to be insertable therein. The fitment protrusion 56 is configured to align with and fit within the recess as a bracket aperture 44 aligns with the grommet aperture 54 to facilitate insertion of the fastener 60 therethrough. Proper orientation of the recess and protrusion 52,56 thereby result in proper orientation of the hook 43 of the bracket 42.

Furthermore, proper outboard facing orientation of the hook 43 ensures correct operation of the sunshade assembly with the hook assembly 40 as the support member of the sunshade assembly can be appropriately secured by the hook 43. The base 45 can also include the notches 48 in opposing sides thereof, as described above. The notches 48 can be configured for engagement by corresponding protrusions extending from respective sides of the cap 46 to secure the cap 46 against the bracket 42.

Figure 8:
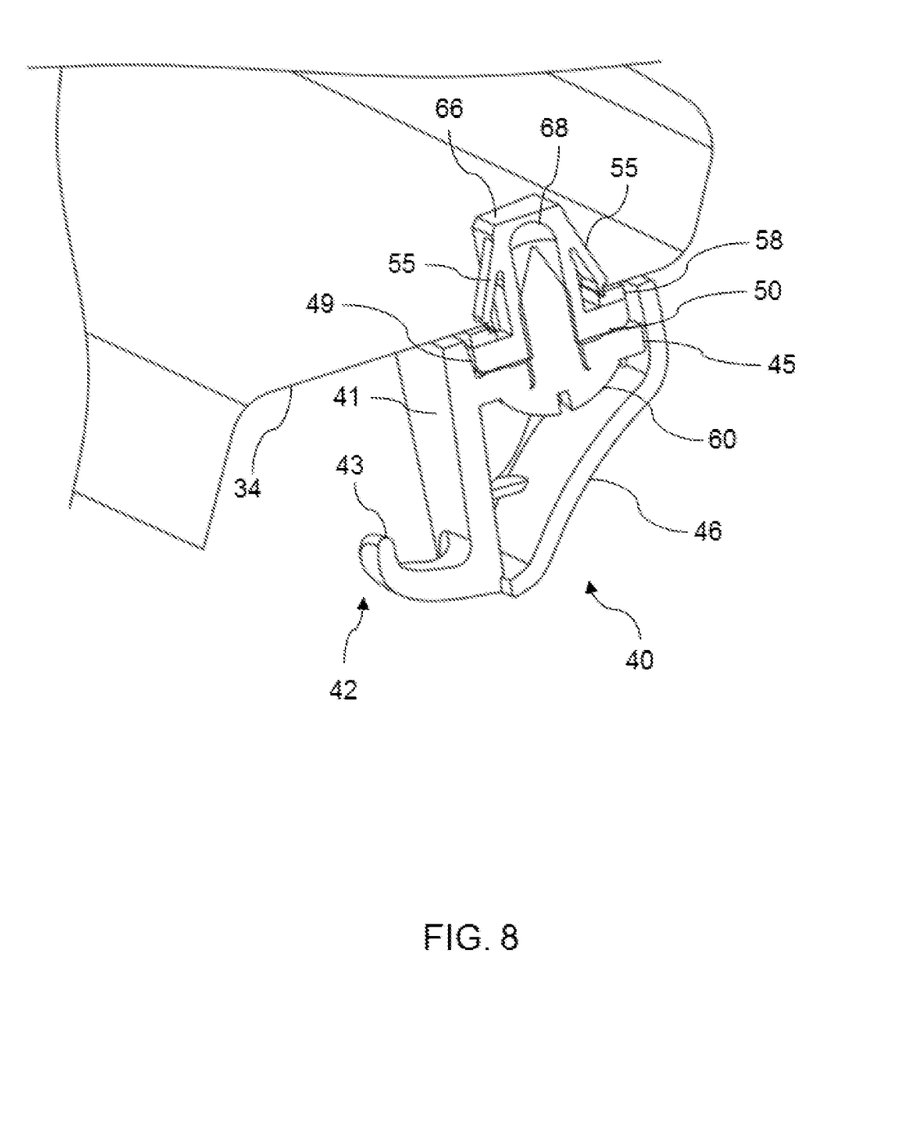
FIG. 8 is a cross-section of the hook assembly of FIG. 1.

FIG. 8 is a cross-section of the hook assembly 40 of FIG. 1. The hook assembly 40 shown in FIG. 8 is installed and connected to the rear door lining 34 of the vehicle 10 via the fastener 60 being inserted through the bracket 42, the grommet 50 and the seal 58. The cap 46 can thereafter be snapped onto the bracket 42 to cover the fastener 60 and at least part of the bracket 42.

As described above, the grommet 50 of the present embodiment can include the locking legs 55 extending from an insert portion 66, the insert portion 66 connected to the outer face 51 and being configured for insertion into the interior of the rear door lining 34. The locking legs 55 can specifically extend from an end of the insert portion 66 and may each include a living hinge by which they bend away from the insert portion 66 upon insertion of the fastener 60 into an interior channel 68 of the grommet 50 As described above, the channel 68 may be threaded to engage the fastener 60. By bending away from the insert portion 66, the locking legs 55 expand into the interior of the rear door lining 34, securing the grommet 50 against the rear door lining 34. Since the fastener 60 may also secure the bracket 42 to the grommet 50, the locking legs 55 expanding into the rear door lining 34 also secures the bracket to the rear door lining 34, and therefore ensures proper placement and orientation of the hook 43. Thus, proper placement and orientation of the hook 43 relative to the support member attached to the screen facilitates proper operation of the sunshade assembly in covering the rear window 32.

III. Method of Installation

Installing the hook assembly 40 to the rear door lining 34 may firstly comprise connecting the grommet 50 with the seal 58 in embodiments in which the seal 58 is included. The grommet 50 and the seal 58 may be brought into contact with one another against the interior facing surface of the rear door lining 34, or may alternatively be disposed against each other and then brought into contact with the rear door lining 34. Additionally, the bracket 42 may be brought into contact with the grommet 50 on an opposing side from the seal 58. The bracket 42 is turned until properly oriented with the grommet 50, indicated by fitment of the fitment protrusion 56 within the recess 52. Order in which the bracket 42 and the seal 58 are positioned to abut the grommet 50 may be varied in different embodiments.

Once the grommet 50 is disposed between the bracket 42 and the seal 58, and the seal 58 is brought into contact with the rear door lining 34, the fastener 60 may be inserted therethrough. The fastener 60 thereby connects the bracket 42 to the grommet 50, and the grommet 50 to the rear door lining 34 via the locking legs 55. The seal 58 is pressed between the grommet 50 and the rear door lining 34 by virtue of attachment force of the fastener 60 pulling the bracket 42 and the grommet 50 towards the rear door lining 34.

Then, the cap 46 may be snapped onto the bracket 42 to cover the fastener 60 and portion of the bracket 42 facing the interior of the vehicle 10. The cap 46 may thereafter be removed from the bracket 42 through engagement of the cap notch 62 by an appropriate tool such that the cap 46 is dislodged from the bracket 42. Once the cap notch 62 is removed, the fastener 60 can also be removed, retightened, etc. to adjust or replace components of the hook assembly 40. The cap 46 can thereafter be reinstalled onto the bracket 42 in similar fashion to complete installation again.

Order of completion of the above described steps in installing the hook assembly 40 to the rear door lining 34 may vary across different embodiments. The above described order is intended for exemplary purposes only, and does not limit alternative installation steps.

IV. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of the hook assembly 40 connected to the rear door lining 34 as shown in FIGS. 2-8. However, embodiments are intended to include or otherwise cover a hook assembly configured for attachment adjacent any window for securing a sunshade screen in an open position covering the window, as disclosed above.

In fact, in some embodiments, the hook assemblies 40 of the exemplary rear door lining 34 can be connected to lining of front doors, hatch assemblies, or tailgate assemblies of a vehicle. Furthermore, windows disposed within fixed panels other than doors such as those adjacent third row seating of a vehicle may include the disclosed hook assemblies 40 such that the hook assemblies 40 are configured to secure sunshade screens extending up over the third row windows. Sunroofs/moon roofs, front windshields, and rear windshields of vehicles may also be configured to incorporate the hook assemblies 40 attached to linings thereof for securement of corresponding sunshade screens in accordance with the disclosed subject matter.

All or some of the alternative structures disclosed above with regard to the hook assemblies 40 also apply to non-vehicular applications. The above alternative configurations of the hook assemblies 40 are merely provided for exemplary purposes, and as indicated above, embodiments are intended to cover any type of support member attached to a lining surrounding a window configured to hold open and secure a sunshade screen across the window that operate or otherwise perform as disclosed above.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A hook assembly for use with a vehicle having a vehicle interior, a vehicle door having a window bordered on at least a side by a lining disposed within the vehicle interior, and a sunshade assembly configured to extend over at least part of the window so as to at least partially cover the window, the sunshade assembly having a support member by which the sunshade assembly can be secured to the lining to extend over and cover at least part of the window, the hook assembly comprising:
   a grommet configured to be connected to the lining; and
   a hook member configured to be disposed adjacent and attached to the grommet such that the grommet is disposed between the hook member and the lining separating the hook member from the lining, the hook member including a hook extending therefrom, the hook being configured to engage the support member to secure the sunshade assembly to the lining to extend over and cover at least part of the window;
   wherein the grommet includes an angular opening in a planar face of the grommet configured to abut the hook member, and the hook member includes a complementary angular projection in a planar base of the hook configured to abut the grommet such that the opening of the grommet is configured to engage the complementary projection of the hook in a single orientation of the respective surfaces relative to each other.

2. The hook assembly according to claim 1, wherein the grommet is configured to be inserted into an aperture in the lining, the grommet having a certain shaped perimeter complementary to a shaped opening of the aperture such that the perimeter of the grommet aligns with the opening of the aperture upon proper orientation relative to each other.

3. The hook assembly according to claim 2, wherein both the perimeter of the grommet and the opening of the aperture are trapezoidal.

4. The hook assembly according to claim 1, wherein the opening of the grommet is a recessed portion depressed from the planar face configured to abut the hook member, and the projection of the hook is a protruding portion extending from the planar base configured to abut the grommet such that the protruding portion is configured to fit into the recessed portion upon proper orientation of the respective surfaces relative to each other.

5. The hook assembly according to claim 1, wherein the opening of the grommet and the projection of the hook are both L-shaped so as to be complementary and configured to engage each other.

6. The hook assembly according to claim 1, wherein the opening of the grommet and the projection of the hook are configured to engage each other upon outboard orientation of the hook such that the hook faces away from the interior of the vehicle and towards the window.

7. The hook assembly according to claim 1, further comprising a cap configured to at least partially cover the hook member.

8. The hook assembly according to claim 7, wherein the cap is configured to include a notch so as to be removable from the hook member.

9. A vehicle door assembly for use with a vehicle having a vehicle interior and a sunshade assembly having a support member, the vehicle door assembly comprising:
   a vehicle door;
   a window disposed within the vehicle door over at least part of which the sunshade assembly is configured to extend so as to at least partially cover the window;
   a lining disposed within the vehicle interior and bordering at least a side of the window to which the sunshade assembly can be secured by the support member to cover at least part of the window; and
   a hook assembly that includes:
      a grommet configured to be connected to the lining; and
      a hook member configured to be disposed adjacent and attached to the grommet such that the grommet is disposed between the hook member and the lining separating the hook member from the lining, the hook member including a hook extending therefrom, the hook being configured to engage the support member to secure the sunshade assembly to the lining to extend over and cover at least part of the window;
      wherein the grommet includes an angular opening in a planar face of the grommet configured to abut the hook member, and the hook member includes a complementary angular projection in a planar base of the hook configured to abut the grommet such that the opening of the grommet is configured to engage the complementary projection of the hook in a single orientation of the respective surfaces relative to each other.

10. The vehicle door assembly according to claim 9, wherein the grommet is configured to be inserted into an aperture in the lining, the grommet having a certain shaped perimeter complementary to a shaped opening of the aperture such that the perimeter of the grommet aligns with the opening of the aperture upon proper orientation relative to each other.

11. The vehicle door assembly according to claim 10, wherein both the perimeter of the grommet and the opening of the aperture are trapezoidal.

12. The vehicle door assembly according to claim 9, wherein the opening of the grommet is a recessed portion depressed from the planar face configured to abut the hook member, and the projection of the hook is a protruding portion extending from the planar base configured to abut the grommet such that the protruding portion is configured to fit into the recessed portion upon proper orientation of the respective surfaces relative to each other.

13. The vehicle door assembly according to claim 9, wherein the opening of the grommet and the projection of the hook are both L-shaped so as to be complementary and configured to engage each other.

14. The vehicle door assembly according to claim 9, wherein the opening of the grommet and the projection of the hook are configured to engage each other upon outboard orientation of the hook such that the hook faces away from the interior of the vehicle and towards the window.

15. The vehicle door assembly according to claim 9, further comprising a cap configured to at least partially cover the hook member, the cap including a notch so as to be removable from the hook member.

16. A method of installing a hook assembly in a vehicle having a vehicle interior, a vehicle door having a window bordered on at least a side by a lining disposed within the vehicle interior, and a sunshade assembly configured to extend over at least part of the window so as to at least partially cover the window, the sunshade assembly having a support member by which the sunshade assembly can be secured to the lining to extend over and cover at least part of the window, the method comprising:

connecting a grommet to the lining; and connecting a hook member to the grommet such that the grommet is disposed between the hook member and the lining separating the hook member from the lining, the hook member including a hook extending therefrom, the hook being configured to engage the support member to secure the sunshade assembly to the lining to extend over and cover at least part of the window;

wherein the grommet includes an angular opening in a planar face of the grommet configured to abut the hook member, and the hook member includes a complementary angular projection in a planar base of the hook configured to abut the grommet such that the opening of the grommet is configured to engage the complementary angular projection of the hook in a single orientation of the respective surfaces relative to each other.

* * * * *